United States Patent [19]
Carroll

[11] Patent Number: 5,263,896
[45] Date of Patent: Nov. 23, 1993

[54] METHOD AND APPARATUS FOR STORAGE OF GRANULAR MATERIALS

[76] Inventor: Michael W. Carroll, 250 Lincoln St., Roselle, Ill. 60172

[21] Appl. No.: 885,494

[22] Filed: May 19, 1992

[51] Int. Cl.$^5$ .............................................. A01F 25/08
[52] U.S. Cl. ................... 454/181; 99/646 S; 454/174; 454/182
[58] Field of Search .............. 99/646 S; 454/173, 174, 454/175, 181, 182, 356

[56] References Cited

U.S. PATENT DOCUMENTS

| | | | |
|---|---|---|---|
| Re. 32,536 | 11/1987 | Wolstenholme | 454/182 X |
| 2,804,897 | 9/1957 | Wunderwald et al. | 99/646 S X |
| 3,280,473 | 10/1966 | Sullivan | 454/182 X |
| 3,520,093 | 7/1990 | Painter | 454/356 X |
| 4,454,807 | 6/1984 | Wolstenholme | 99/646 S |
| 4,627,333 | 12/1986 | Anderson et al. | |
| 4,726,286 | 2/1988 | Anderson et al. | |
| 4,887,400 | 12/1989 | Carroll | 52/195 |

*Primary Examiner*—Harold Joyce
*Attorney, Agent, or Firm*—Fitch, Even, Tabin & Flannery

[57] ABSTRACT

Method and apparatus for storing grain in a conical pile that is aerated by means of a centrally located aeration tower. The apparatus is broken down for shipment into components which are readily erected in a site area without construction equipment which include a loading conveyor supported by a mast mounted in the site area and which is removable after filling of in site area with grain.

23 Claims, 12 Drawing Sheets

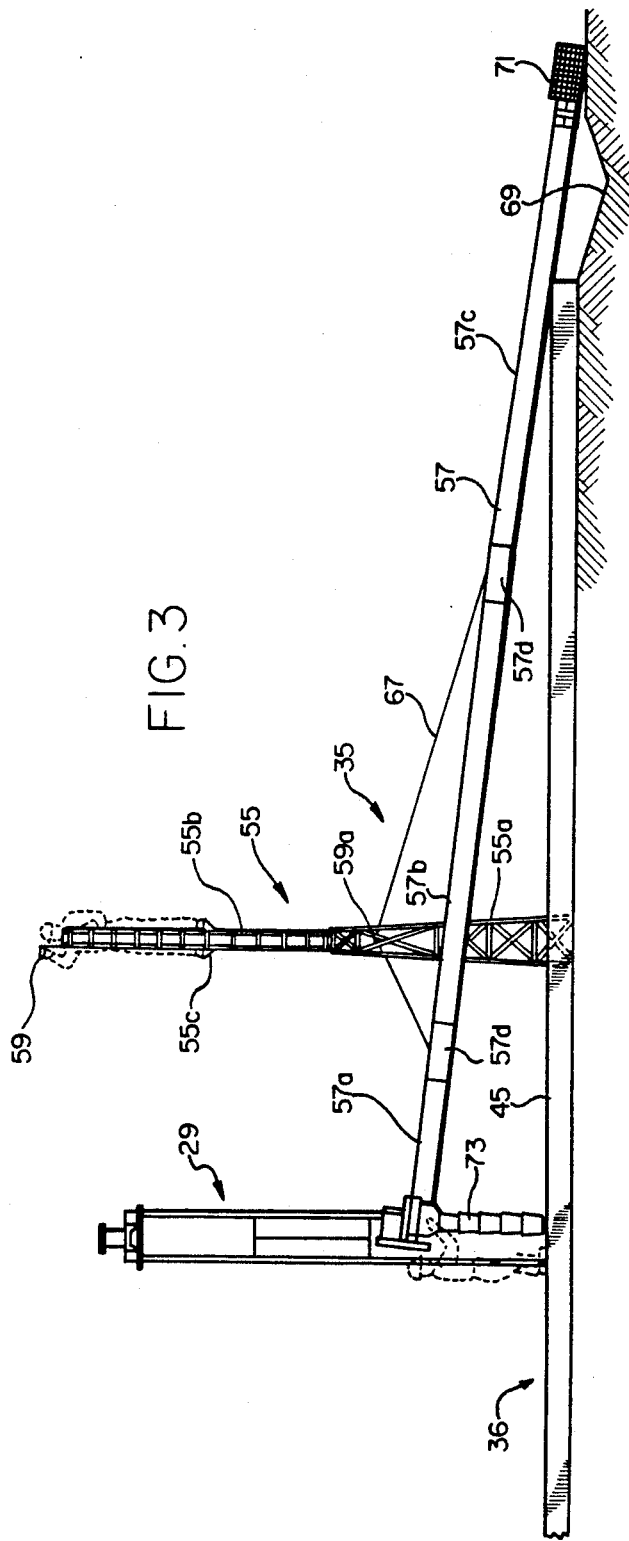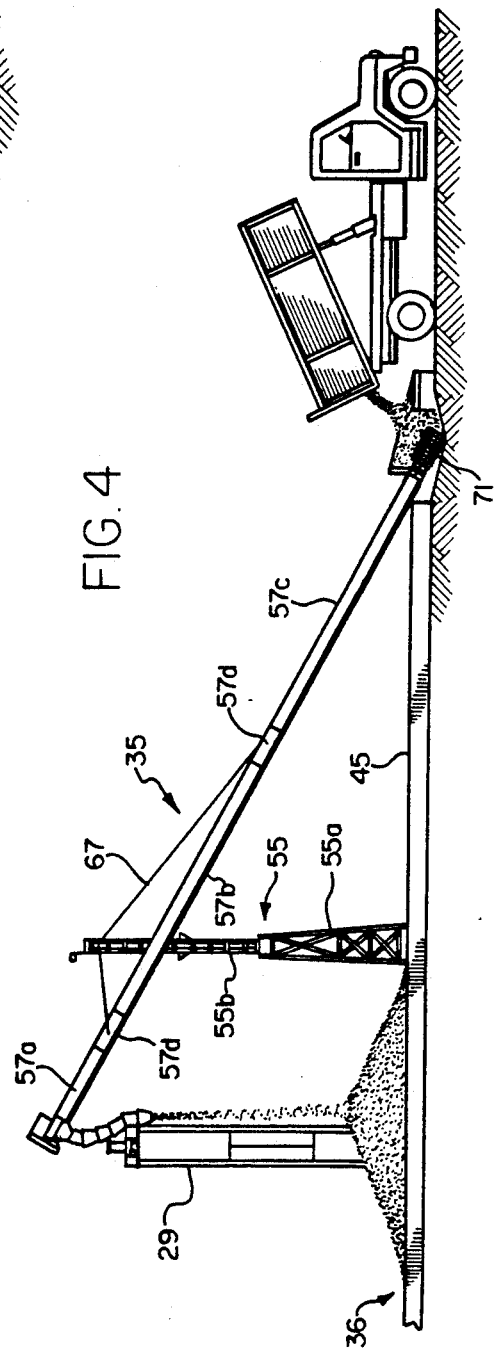

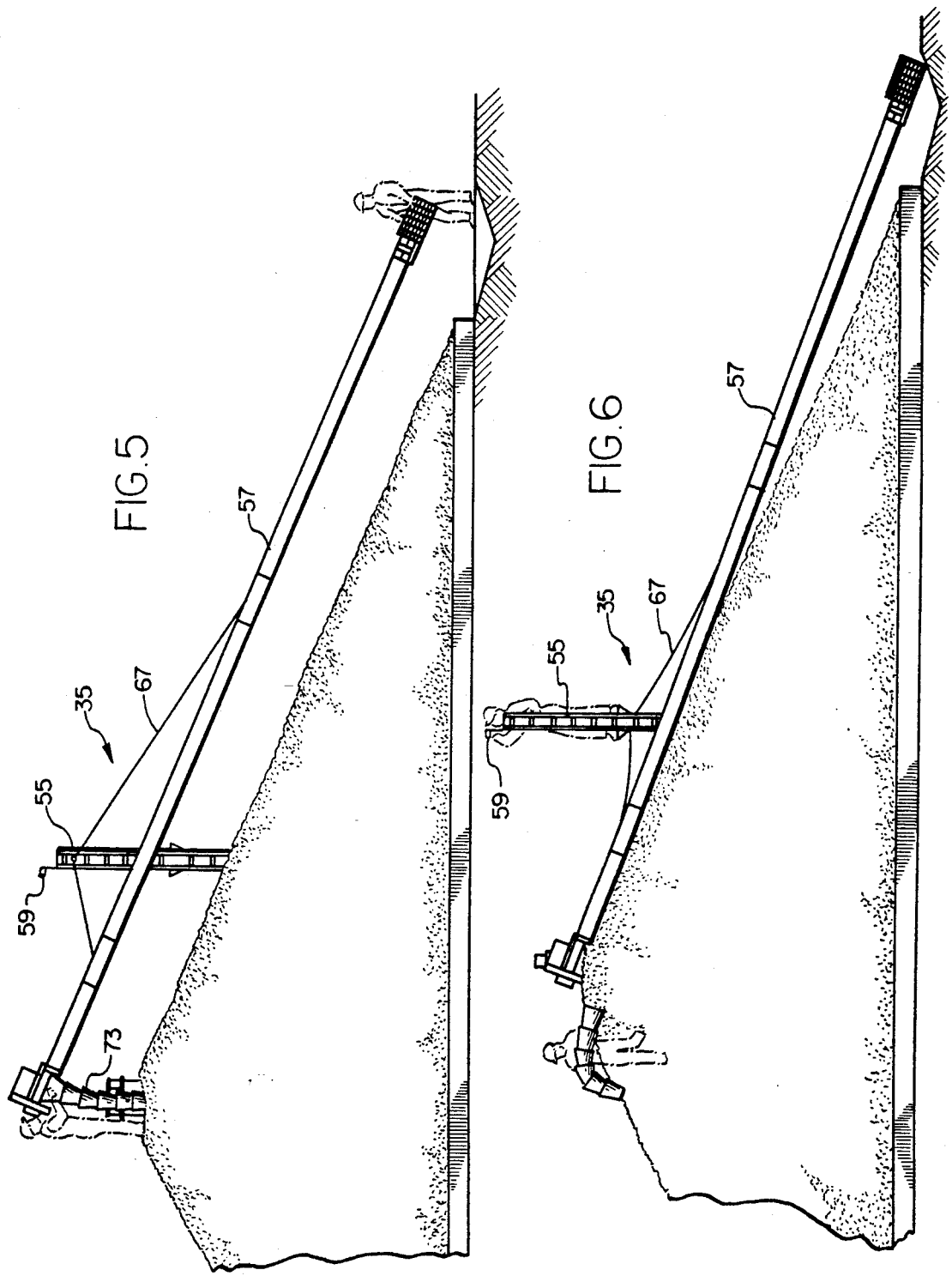

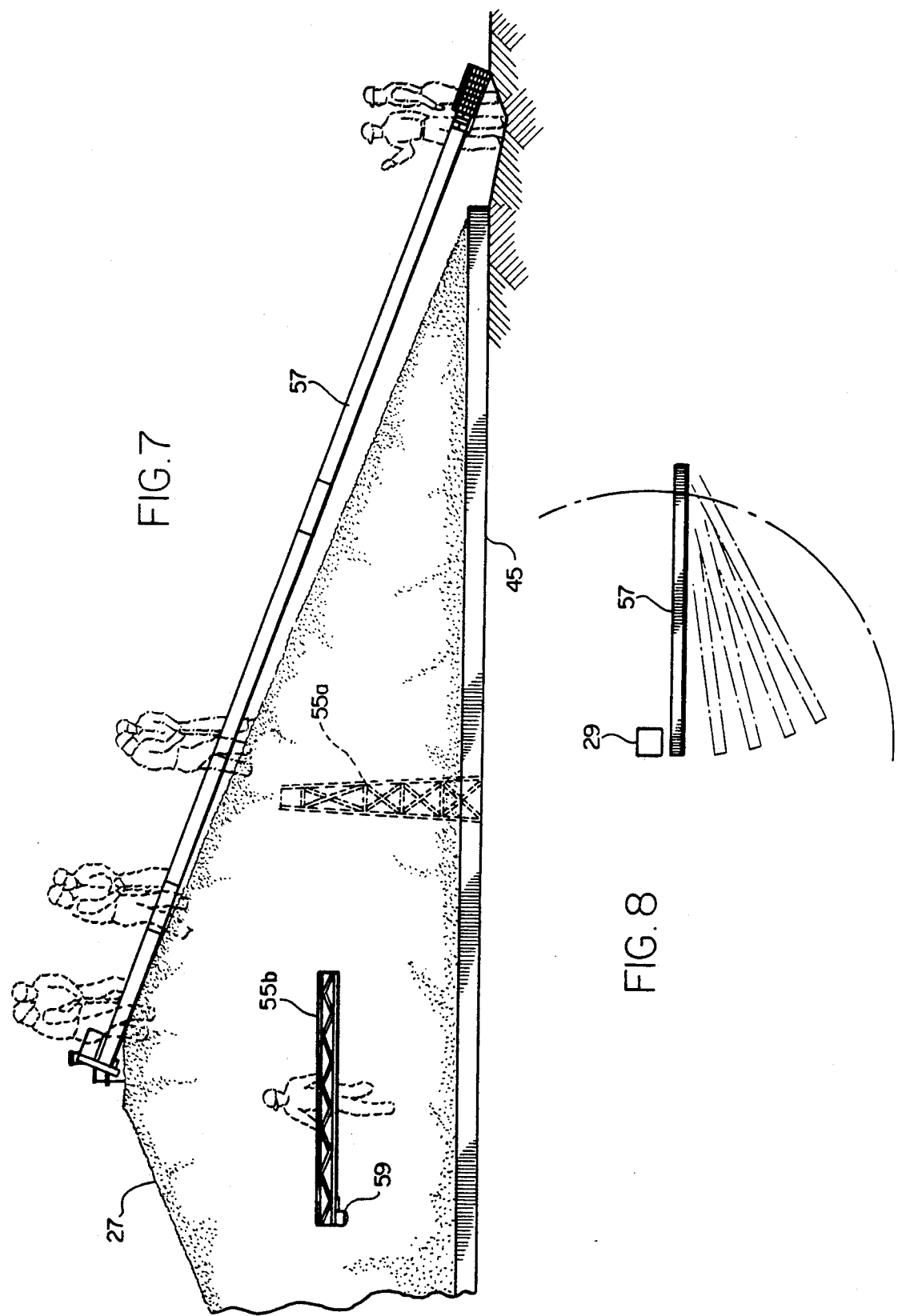

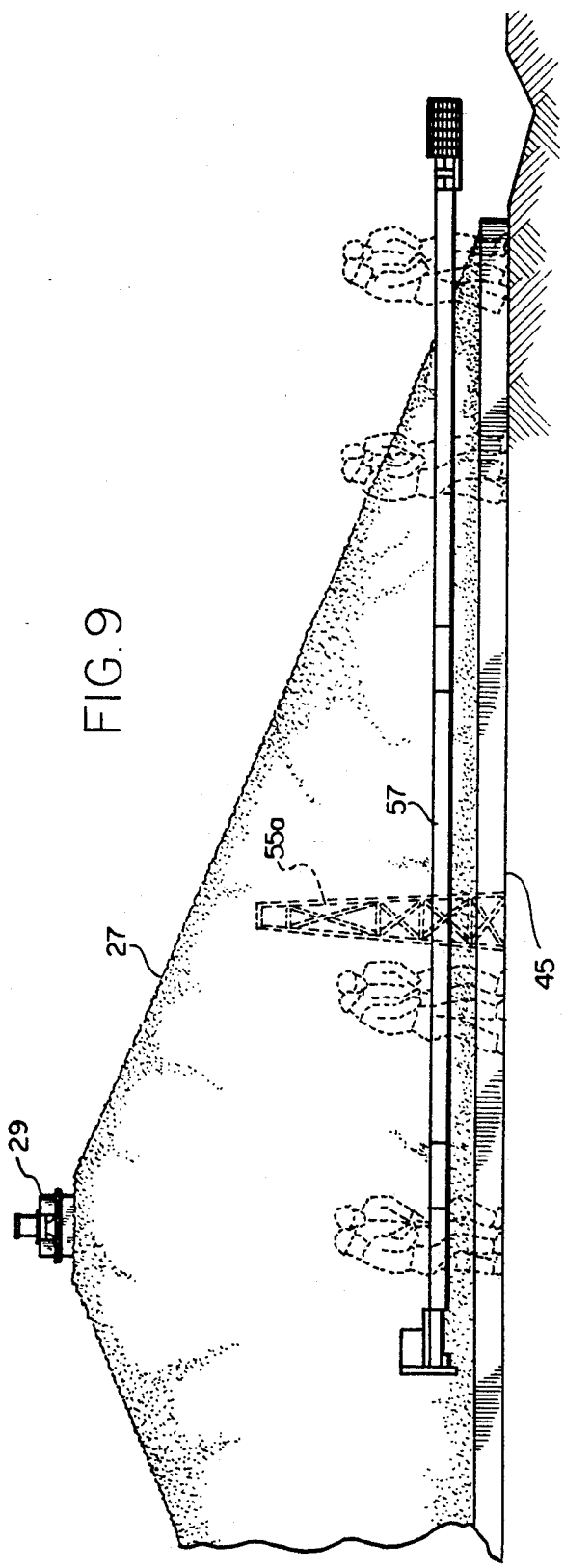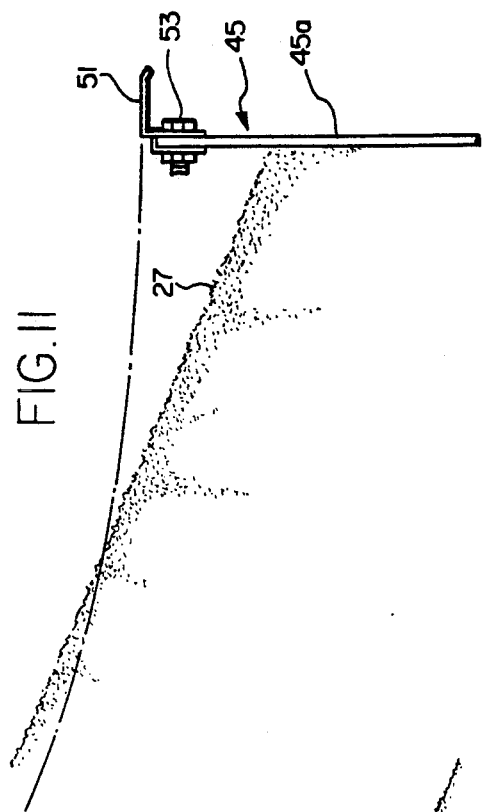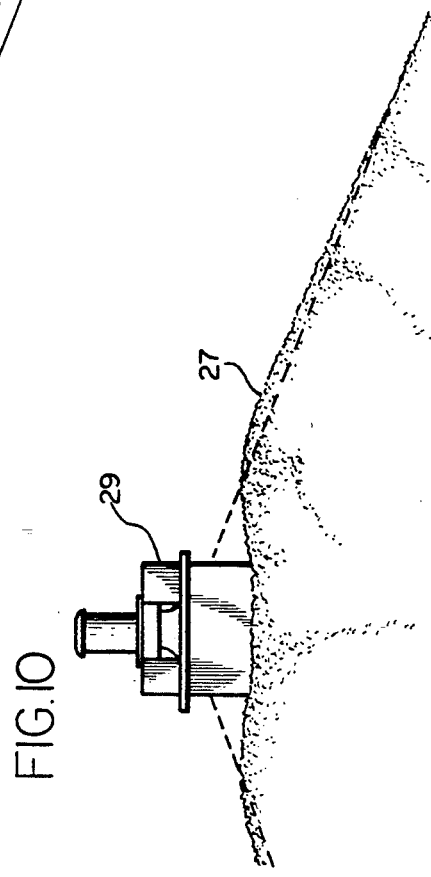

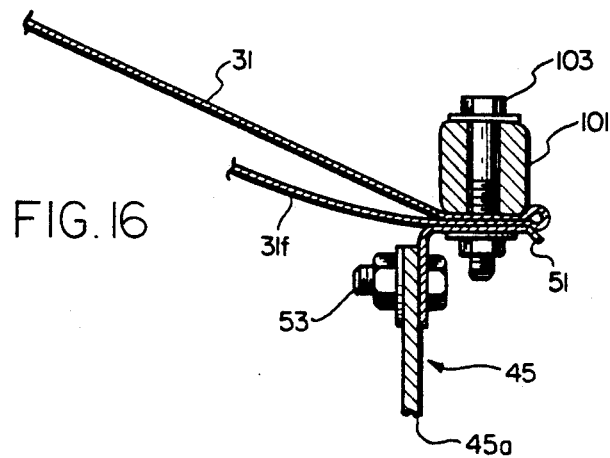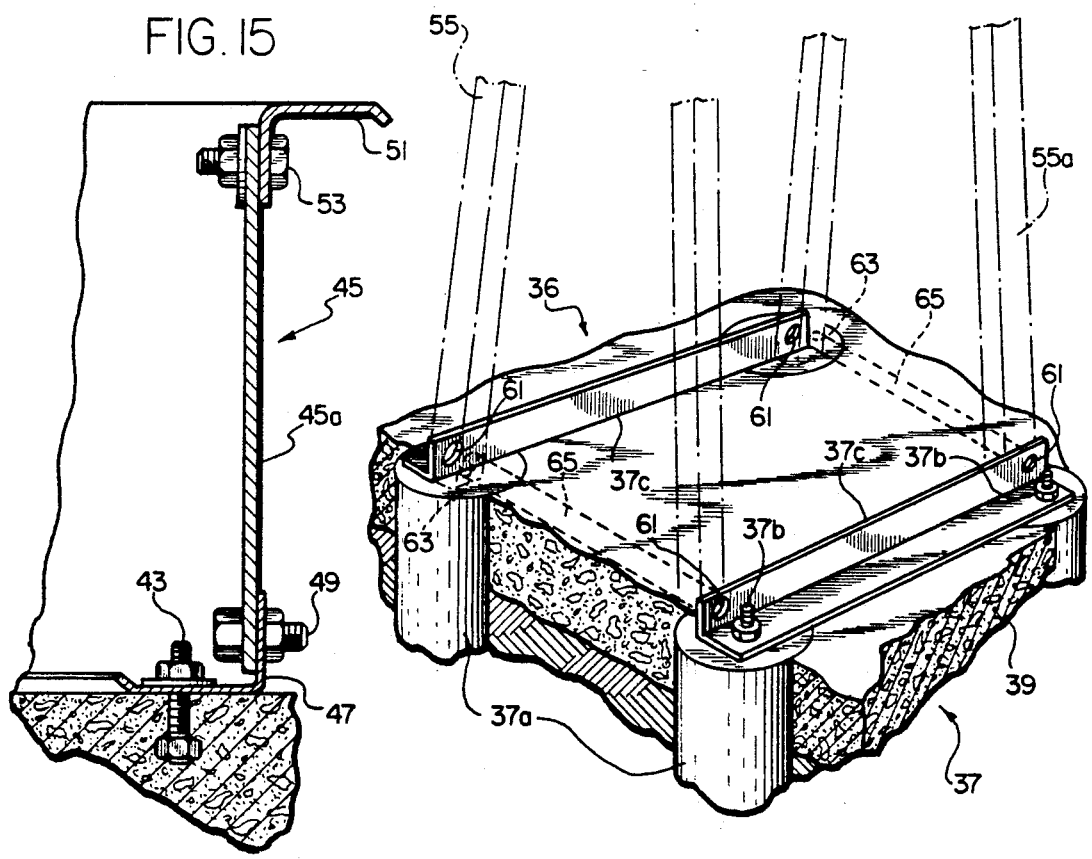

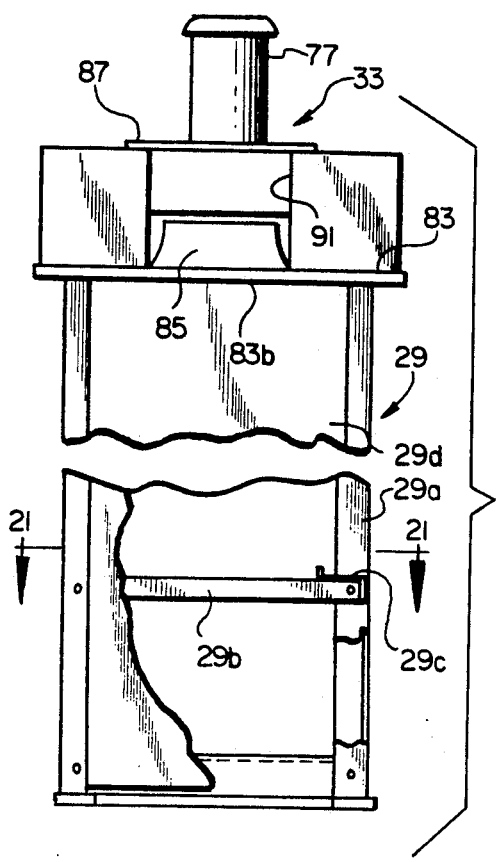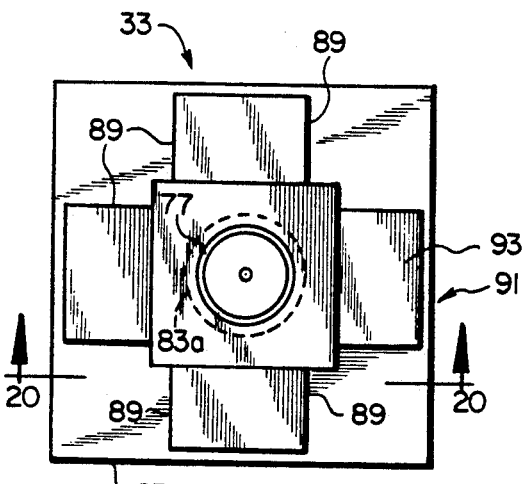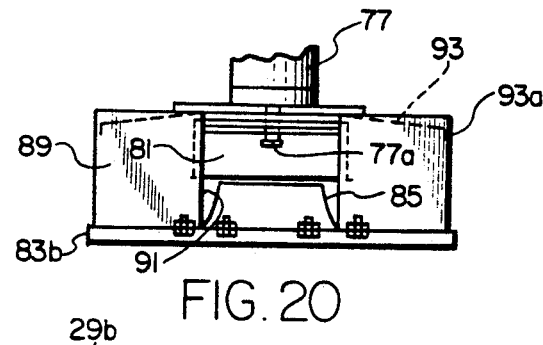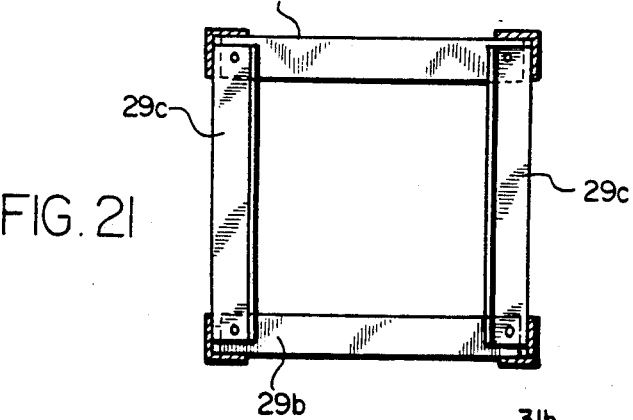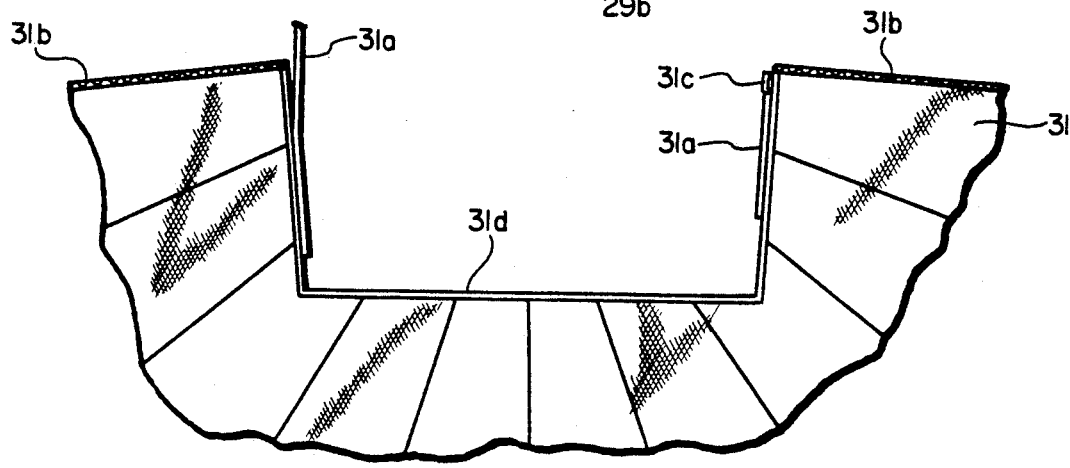

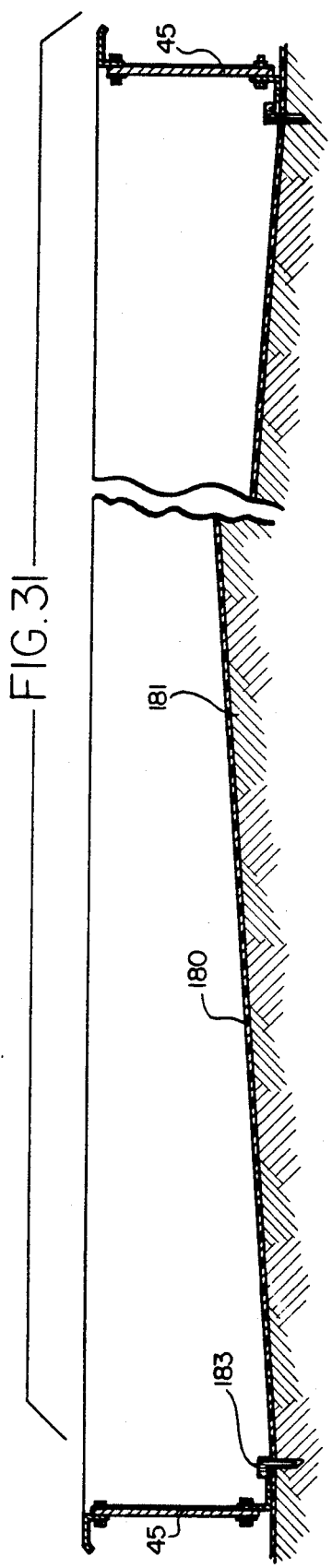
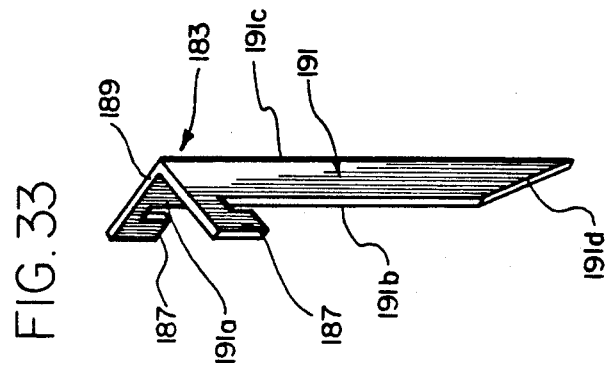
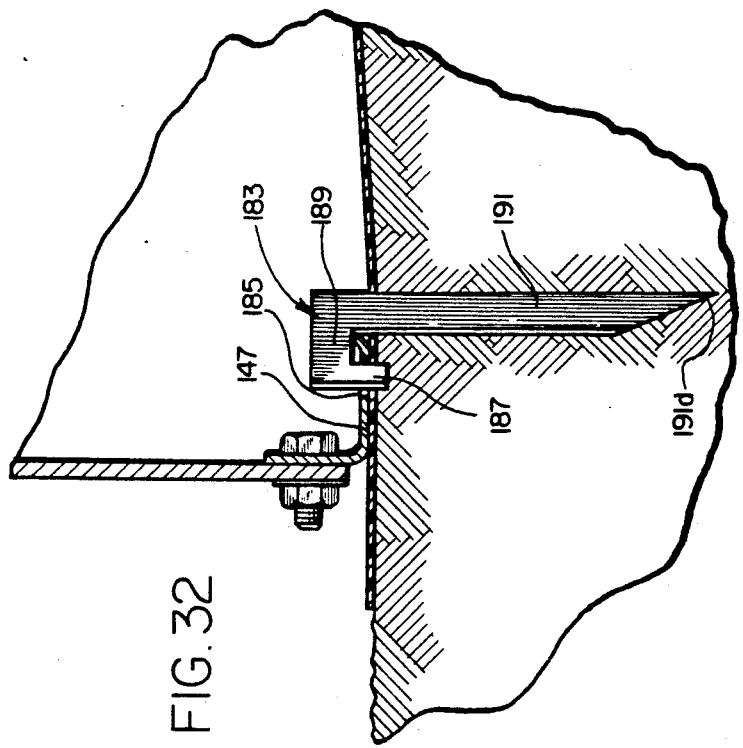
FIG. 31
FIG. 33
FIG. 32

METHOD AND APPARATUS FOR STORAGE OF GRANULAR MATERIALS

BACKGROUND OF THE INVENTION

The present invention relates generally to storage of granular materials and, more specifically, to a method and apparatus for providing low cost storage facilities for grain to prevent deterioration during substantial periods of storage.

In all areas of the world in which grain is produced, there is a need for substantial storage facilities. Because of the large amounts of grain that are harvested over a short period of time, it is desirable to store the grain for varying periods of time before it is used or shipped to market. The nature of grain is such that it may be stored for several years at ambient temperature as long as it is kept dry and well ventilated or aerated. One of the common types of grain storage facility that has evolved has a generally conical form including a protective cover and means for circulating air continuously through the grain to prevent heat build-up and to maintain constant or reduce the moisture content. There have been many different approaches to the problem of aeration of all of the volume of stored grain. If portions of the grain are not aerated, "dead spots" will result where the temperature will increase, allowing insect activity and rotting of the grain.

Many of the storage facilities have been constructed with storage capacities of two million bushels of grain. Although there are cost advantages associated with large grain storage facilities, there are also some disadvantages. As the volume and weight of grain increases, it becomes more difficult to effectively aerate all the grain being contained in the facility. It has also been found that the structural requirements for such large grain storage facilities present erection problems in many areas of the world.

In many countries, there are serious transportation limitations that have resulted in huge quantities of grain rotting before it could be shipped to market or to any sort of grain storage facility. In such countries the farms are often in remote locations and there are not adequate rail or truck transportation means for the farmer to ship his harvested grain to a storage facility before it deteriorates as a consequence of being exposed to the weather. There is a definite need in the countries for a low cost grain storage facility which would be available locally in situations where there is not adequate transportation to ship to a large central storage facility.

A further problem encountered when attempting to provide adequate grain storage relates to the lack of construction equipment available in rural areas of many countries. The typical grain storage facility includes a large aeration tower, requiring a large crane to erect it. In addition, the grain delivery or conveyor system is usually large and cumbersome, requiring a crane for lifting it into place. The foundation for such storage facilities requires substantial quantities of concrete normally not available in remote rural locations. Accordingly, there is a need for a low cost grain storage facility which could be erected without the use of special construction equipment and which would not require large amounts of concrete for a foundation.

The typical prior art grain storage facilities have flexible conical covers to enclose and protect the grain. Examples of these designs are disclosed in the Wolstenholme U.S. Pat. No. 4,454,807; Anderson, et al. No. 4,627,333; Carroll No. 4,887,400; and Anderson, et al. No. 4,726,286. The conical configuration is used because the grain may be piled in this configuration without use of any structural containment walls. The angle of the conical surface with respect to the horizontal surface is about 22°, which is the angle of repose of the stored grain. A circular support foundation, including a circular support floor, is normally provided and the grain is delivered to the center to form the conical pile. A flexible conical cover is provided and the grain is inserted beneath the cover. There is normally a support provided for the cover during and after filling of the facility. In some instances the conical pile of stored grain is used as the support for the cover. In the center of the circular support floor, there may be an aeration tower which is designed to draw air through the grain in a generally radially inward direction and then expel it to the atmosphere. There are other duct arrangements used to provide aeration of the grain, but most of them fail to completely aerate the grain in the area of the central axis of the conical pile of grain. The centrally disposed aeration tower may also provide a convenient support for the conveyor that delivers grain to the center of the pile of grain.

The grain conveyor associated with the storage facility extends radially from the top of the aeration tower to the edge of the support floor where there is a generally cylindrical aeration wall. At the other end of the conveyor there is provided a dump pit or the like where grain is deposited temporarily until picked up by the conveyor, which may be a screw or auger type conveyor. At the inner end of the conveyor, a chute of some sort receives the grain and distributes it around the axis of the aeration tower to form the conical pile. The conveyor spans a substantial distance from the edge to the center of the storage facility and is therefore provided with structural support bracing and normally requires a crane to lift it into place.

In order to provide adequate air for aeration of the grain, there are normally provided large motor driven blowers that are located around the periphery of the circular support floor. With the blowers located at the periphery and the air being drawn into the aeration tower, it is necessary to provide a duct from the base of the aeration tower to the air blowers. Thus, the air is drawn radially inwardly through the aeration wall and through the grain pile to the centrally disposed aeration tower, where it is drawn downwardly and then outwardly to the blower. The aeration wall lies along the outer periphery of the conical storage facility and is angled outwardly and provided with air inlet openings which limit the entrance of rain or snow with the air being circulated through the grain.

The storage facility will accommodate for storage on the order of 2 million bushels of grain necessitating good local transportation to bring the grain from the farm to the storage facility. Such good transportation is often not available in remote regions of many countries. Because of the massive size of the grain piles in these storage facilities, there are large pressures compacting the grain at the bottom of these piles. This condition makes proper aeration of the grain difficult and requires that grain supplied to such facilities have low moisture content, i.e., 16% or less. In order to achieve the desired moisture content level, grain dryers are frequently employed. Once the grain has been dried in a grain dryer, the large capacity grain storage facilities described above aerate the grain adequately to prevent deterioration in storage. However, these countries generally have no grain dryers other than air drying the grain in the sun if the weather permits. For use in such countries, it would be desirable to have grain storage facilities that could provide a high level of aeration that would permit storage of high moisture content grain without deterioration of the grain. Particularly, it would be desirable to provide a level of aeration in a grain storage facility that would permit storage of recently harvested grain, and which would dry and reduce the moisture level during the storage period.

In those areas where grain dryers are not readily available to dry the grain prior to storage, the moisture content of the grain may be in the range of 15 to 20 percent moisture; whereas, where dryers are available the grain is usually stored with only 12 to 14 percent moisture. The amount of drying accomplished within the storage facility depends on the grain involved and the ambient conditions. The cleanliness of the grain can also be a significant factor. In arid regions, the grain dries faster than in humid regions; and in cold weather areas, moisture may be sublimated thereby reducing the moisture content of the stored grain. As will be explained, the preferred method and apparatus not only store the grain but also reduce its moisture content substantially when the grain is stored without first being dried.

The above-described grain storage facility, which is typical of those being erected and used, is expensive and complicated to erect, requiring materials and construction equipment that may not be available in some regions of many countries. It would also be desirable to provide a grain storage apparatus which could be easily shipped to a remote site and could be erected using only manual labor and no special construction equipment such as cranes and the like.

SUMMARY OF THE INVENTION

The present invention relates to grain storage apparatus which is capable of being erected without any special construction equipment at the site and using only manual labor. The subject storage apparatus is of limited capacity, capable of storing small quantities of grain, preferably in the range of 5,000 to 40,000 bushels of grain, and is suitable for use in geographical areas in which transportation facilities are limited and storage in the local area where grain has been grown is preferred.

The apparatus includes an aeration tower which supports at its upper end a motor driven blower for drawing air radially into the tower and upwardly for discharge to the atmosphere. The aeration tower is supported on four concrete pylons. While in the horizontal position, the tower is pivotally connected to two of the pylons and then pivoted into an upright position. A conveyor support mast is also supported by four concrete pylons and erected in the same manner as the aeration tower. A hand operated winch on the top of the conveyor support mast is connected by a cable to an auger conveyor tube to enable the inner end of the conveyor to be elevated with the hand winch to the height necessary to accommodate the pile of grain at its completed height. The outer end of the conveyor may rest in a dump pit where it draws in the grain to be delivered to storage.

At the inner end of the conveyor there is provided a flexible discharge spout or bucket spout through which the grain is directed onto the storage pile. The flexible spout allows the discharging grain to be directed to provide a uniform conical pile of grain. After the pile extends in height to approach to the top of the aeration tower, the conveyor is easily removed by lowering the winch to slack off the lifting cable and after disconnecting the cable from the winch, the conveyor may be carried down the side of the grain pile and carried manually by 6 or 8 workers to the next apparatus to be filled. The conveyor support mast is formed with a base portion and a post portion supporting the winch so that the winch and post portion of the mast may also be removed for use in filling another storage apparatus.

As compared to the normal approach in which a conical tarp is supported by the aeration tower as the grain is supplied beneath it, the present invention contemplates installation of the tarp after the facility has been filled. Having a smaller capacity, the apparatus of the present invention may be filled more quickly, lessening the risk of rain damage to the grain before the completed conical grain pile may be covered. Once completed, the pile may be covered by dragging the tarp across the grain pile, without the aid of a crane, and then securing the tarp at the aeration tower and around the periphery at the aeration ring. In a first embodiment of the invention, the tarp is formed in several sections that are secured together along a radially extending edge by straps for support and by a zipper to prevent air or water leakage. The inner edge of the tarp includes an opening through which the aeration tower extends and the edge defining the opening is secured to the aeration tower by strips of wood bolted to a downwardly facing shoulder, to clamp and seal the tarp to the tower. The outer peripheral edge of the tarp is secured to the aeration ring by wood strips bolted to an annular rim at the top edge of the aeration ring. In a second embodiment of the invention, the upper edge of the main tarp is tied by straps or ties to a retention ring that circles the main tower and rests on top of the grain pile. A transition tarp is secured about the aeration tower and is superimposed over the upper end of the main tarp. The lower edge of the transition tarp is strapped to the main tarp with the transition tarp providing a generally waterproof transition between the main tarp and the aeration tower. This arrangement provides a well-sealed cover for the apparatus which may be readily installed by unskilled workers using simple tools.

The blower mounted at the top of the aeration tower has large, shielded discharge passageways facing in four quadrants to assure that rain and snow will not be blown into the top of the aeration tower. Deflectors in the discharge passageways direct the discharging air downwardly, limiting the entry of rain or snow into the aeration tower. The configuration of the fan housing with the blower inlet cone shielding the opening into the aeration tower would also limit moisture entry into the storage facility.

The flexible grain discharge spout allows the grain to be discharged more or less randomly at the center adjacent the aeration tower until the assembly is almost filled. At that point, the spout may be manually positioned to direct the inflowing grain so as to form a relatively uniform conical pile of grain, filling any depressions. The shaping of the pile of grain in this manner and further by raking the pile against the aeration tower at the top and against the aeration ring at the bottom assures that the tarp will lie at a proper angle to shed rain, and that there will be no pockets in which leakage might be expected.

The above-described apparatus of the present invention is designed so that it may be readily shipped to and transported within remote areas of any country where its use provides significant advantages. To take advantage of lower labor costs in such countries much of the assembly may be done at the construction site. All of the pieces of the apparatus are less than 18 feet in length, so that the disassembled package for constructing one grain storage facility in accordance with the present invention may be enclosed in a standard 18 foot container used for shipments by boat. The conveyor breaks down into three easily assembled sections. The conveyor support mast is formed by a base portion and an upper post portion which have ends telescopically connected so that the post portion may be easily extracted from the grain pile for use at another facility, leaving only the base portion of the mast buried in the pile of stored grain.

Accordingly, it is an object of the present invention to provide an improved grain storage apparatus which may be erected and utilized with the aid of no construction equipment and using only manual labor.

It is a further object of the invention to provide an improved grain storage apparatus having an aeration tower and support mast for erecting and supporting an elongated grain conveyor.

It is another object of the present invention to provide an improved method of erecting a grain storage facility using manual labor and no construction equipment.

BRIEF DESCRIPTION OF THE DRAWINGS

These and other objects and advantages of the invention will become apparent from the following detailed description taken in conjunction with the accompanying drawings in which:

FIG. 3 is an elevational view of the grain storage apparatus of FIGS. 1 and 2 in the process of being erected;

FIG. 4 is an elevational view of the grain storage apparatus of FIG. 3 which is in the process of being filled with grain;

FIG. 5 is an elevational view similar to FIG. 4 but with the filling of the apparatus having been completed;

FIG. 6 is an elevational view similar to FIG. 5 showing the grain conveyor being lowered and disassembled;

FIG. 7 is an elevational view similar to FIG. 6 showing the grain conveyor and the post portion of the mast being manually removed from the pile of grain;

FIG. 8 is a diagrammatic view showing the manner in which the grain conveyor is removed from the pile of grain;

FIG. 9 is an elevational view of the grain storage apparatus of the present invention after having been filled with grain and illustrating the removal of the conveyor apparatus;

FIG. 10 is a fragmentary view of the top of the grain pile and the top of the aeration tower prior to raking of the grain pile;

FIG. 11 is a fragmentary view of the outer edge of the grain pile prior to raking of the pile;

FIG. 15 is a fragmentary sectional view taken on line 15—15 of FIG. 12;

FIG. 16 is a fragmentary sectional view taken on line 16—16 of FIG. 12;

FIG. 17 is a fragmentary perspective view of the foundation support for the conveyor support mast showing portions of the mast in dashed lines;

FIG. 18 is an elevational view of the aeration tower with portions cut away for the purpose of illustration;

FIG. 19 is a top plan view of the aeration blower assembly for the storage apparatus of the present invention;

FIG. 20 is a sectional view taken on line 20—20 of FIG. 19;

FIG. 21 is a sectional view taken on line 21—21 of FIG. 18; and

FIG. 22 is a fragmentary plan view of a portion of one of the tarp sections which surround the aeration tower.

FIG. 31 illustrates a still another embodiment of the invention in which a plastic sheet is used as a ground cover and in which stakes secure the plastic cover to the aeration ring;

FIG. 32 is an enlarged cross-sectional view showing a connection of the plastic cover sheet to the aeration ring with a stake; and FIG. 33 is a perspective view of the stake.

DETAILED DESCRIPTION OF THE PREFERRED EMBODIMENT

Figure 1:
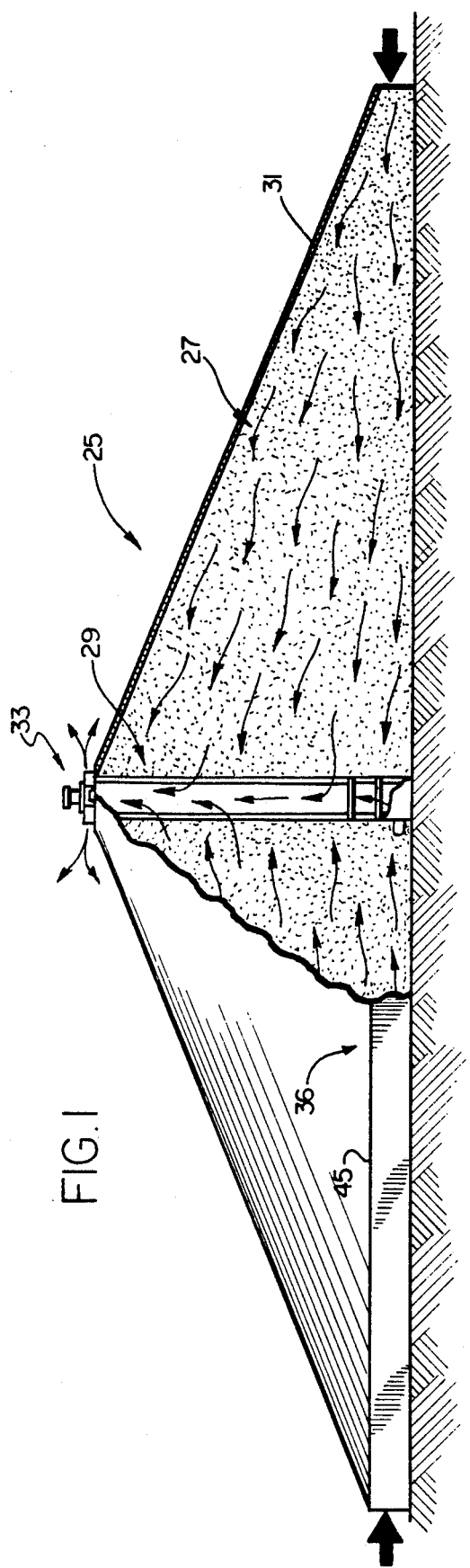
FIG. 1 is a side elevational view of grain storage apparatus embodying the invention, a portion being cut away for the purpose of illustration.

Referring to the drawings, there is shown in FIG. 1 a grain storage apparatus 25 which embodies the present invention. As shown in FIG. 1, the storage apparatus 25 is filled with grain 27 formed in a generally conical pile and is provided with an aeration tower 29 which is adapted to draw in air from the outer periphery of the grain pile and circulate the air through the pile toward a central axis where it is exhausted to the atmosphere. The air flow is directed as shown by a conical tarpaulin or tarp 31 supported by the grain 27. A blower 33 mounted at the top of the aeration tower 29 draws the air inwardly radially under the periphery of the tarp to the tower 29, where it moves upwardly and is discharged.

The present invention relates to the storage apparatus 25 and to the method involved in erecting and filling the storage apparatus which includes a grain conveyor 35 and the means for erecting and supporting the conveyor 35. The grain conveyor 35 is shown in FIGS. 3 and 4.

The grain storage apparatus of the present invention is designed for installation in areas in which sophisticated construction equipment such as cranes and the like are not available and where supplies of mixed cement ready for pouring are not available. The capacity of the grain storage apparatus 25 is on the order of 20,000 bushels of grain or 500 tons of grain. Many existing storage facilities having the central aeration tower and conical grain pile configuration are on the order of one hundred times the capacity of the disclosed apparatus 25. Although there are economies in size and cost savings in large capacity storage facilities, there are many geographical areas in which it is impossible or impractical to construct or erect the large capacity units. The large construction cranes are not available, and there is no large volume supply of premixed concrete. Accordingly, the present invention provides a storage apparatus which can be carried to a construction site in a small "pick-up" truck and can be installed and erected by a small crew of laborers. The small amount of concrete required for the foundation elements can be mixed in a wheel barrel and poured by the same small crew of laborers. This limited capacity storage apparatus provides an ideal solution for grain storage in remote rural areas of many countries. At the present time the unavailability of such grain storage facilities and the absence of adequate transportation and marketing facilities results in a substantial percentage of the grain crop rotting in many countries.

The preferred and illustrated storage unit is very inexpensive and should be erected in many areas at a cost of about $5 per ton or less, in contrast to large steel storage bins, which often cost about $40 per ton to erect, by way of example only.

The site for the grain storage apparatus requires minimal preparation, being graded to drain away from the center of a circular site area 36 about 80 feet in diameter at the outer periphery of which there is poured a ring of concrete 1 foot wide and 4 inches thick on a compacted gravel base. Within the ring, an asphalt base material layer 39 2 inches thick is deposited on compacted gravel. The base material is required to support the grain out of contact with the ground.

The aeration tower 29 and the grain conveyor 35 are each provided with separate foundations 37, as best shown in FIG. 17. These foundations 37 each comprise four concrete posts or pylons 37a about 1 foot in diameter and 4 feet deep poured in holes dug through the base material layer 39. Steel bars 37b with threaded ends are set into the concrete posts 37a with angle iron supports 37c bolted to the posts 37a, as shown in FIG. 17. There are two such foundations constructed, one for the aeration tower and one for the conveyor mast. Each such foundation 37 includes four concrete posts 37a to which are bolted the angle iron supports 37c.

At the time of pouring the concrete for outer support ring 41, a portion of which is shown in FIG. 15, assembly bolts 43 are cast therein for use in retaining aeration ring 45. The aeration ring 45 is formed by a plurality of vertically corrugated and perforated aeration plates 45a about 3 feet long and 1 foot wide that are secured together by bolts not shown and secured to the concrete ring 41 by angle members 47. As shown in FIG. 15, the bolts 43 extend through angle members 47, and bolts 49 secure the angle members 47 to the aeration plates 45a. At the upper edges of the aeration plates 45a, there are provided angle members 51 secured by bolts 53 which are for use in assembling the tarp 31 as will be explained below. The angle members 47 and 51 are made interchangeable to reduce costs and simplify assembly.

Figure 2:
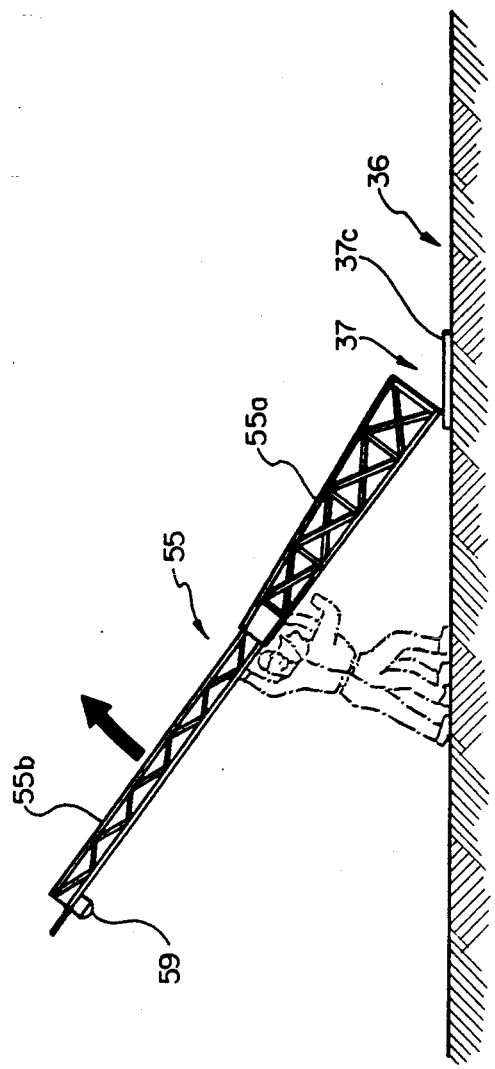
FIG. 2 is an elevational view of a step in the erection of the grain storage apparatus of the present invention.

After the foundations 37 have been constructed, the aeration tower 29 and the grain conveyor 35 may be erected. The grain conveyor 35 includes a mast 55 and an elongated auger 57. Both the mast 55 and the auger 57 are constructed so that they may be shipped in sections less than 18 feet long for accommodation in containerized shipments. The mast 55 consists of a base portion 55a and a post portion 55b. The base portion 55a is of generally square cross section, tapering toward the upper end where it is formed with an opening to telescopically receive the lower end of the post portion 55b which also has a square cross section. In the assembled relation as shown in FIG. 2, the portions 55a and 55b of the mast overlap about 15 inches, providing about a 20 foot high mast. Before erecting the mast, a hand winch 59 is secured by bolts to the upper end of the mast 55.

The lower end of the mast 55 is dimensioned to fit between the members 37c and is formed with two pairs of aligned openings 63 which are spaced to be aligned with openings 61 in angle iron foundation members 37c, as shown in FIG. 17. In erecting the mast 55, a rod 65 is inserted through one set of aligned openings 63 in the mast 55 and the openings 61 in the foundation members 37c, with the mast in the horizontally extending position so that the rod 65 serves as a hinge member during the movement of the mast to the upright position, as shown in FIG. 2. Thus the 20 foot mast may be easily erected by two individuals at ground level. After the mast has been moved to the vertical position, a second rod 65 is inserted into the other set of aligned openings to secure the mast 55 to the foundation 37. Suitable openings are provided in the rods 65 to permit the use of cotter pins to secure the rods 65 against axial displacement after they are assembled to the foundation members 37c.

After the aeration tower 29 and the conveyor mast 55 have been erected as described above and secured to their respective foundations 37, the conveyor auger 57 is assembled. The grain auger includes a metal tube and an elongated auger in the tube for moving grain up the tube. As stated above, the conveyor auger is shipped in easily assemblable sections 57a, 57b and 57c to permit containerized shipment of the entire grain storage apparatus 25. The sections are joined at coupling segments 57d which also have connections for a support cable 67. The auger 57 is assembled in the site area 36 in a generally radially extending position with respect to the axis of the aeration tower 29, with the discharge end adjacent the tower and the load end adjacent a dump pit 69 for receiving grain, as shown in FIG. 4. A cylindrical intake guard 71 is assembled to the load end of the auger to serve as a safety guard through which the grain may pass to the auger member within the tubular housing.

The hand winch 59 includes a cable 59a which is then coupled to the conveyor support cable 67 in order to lift the discharge end of the auger 57, as shown in FIGS. 3 and 4. A manual operation of the hand winch is accomplished by a person standing on steps 55c on the mast 55, as shown in FIG. 3. Prior to elevating the auger to the filling position shown in FIG. 4, a flexible discharge spout 73 is connected to the inner end of the auger. The point at which the winch cable 57a couples to the support cable 67 is chosen so that the weight of the auger 57 is largely supported by the mast 55 and winch 59, with it being slightly unbalanced to maintain the outer or load end on the ground. The balance is such that a lifting force of 50 pounds is necessary to lift the load end of auger 57, as shown in FIG. 5. The cable 59a is connected to the conveyor which includes a central tube in such a manner that the forces acting on the tube are distributed so as not to buckle the conveyor tube as it is being lifted.

Before proceeding with a description of the filling of the apparatus 25, the construction of the aeration tower 29 will be discussed. The aeration tower 29 is an approximately 16 foot high steel frame formed with lengthwise extending angle iron corner members 29a connected by transversely extending channel members 29b and transversely extending Z-members 29c, as shown in FIGS. 18 and 21. The frame has a 26 inch square cross section which has four vertically extending sidewalls 29d formed by perforated aeration plates which permit air to flow into the tower but prevent passage of grain into the tower. Mounted at the top of the tower 29 is the blower 33 which is shown best in FIGS. 18 to 20. The blower 33 includes an all-weather motor 77 which is mounted to the top wall of a fan housing 79. The motor 77 is disposed vertically with an armature shaft 77a extending into the fan housing 79, where it supports at its lower end a blower wheel 81 which is a commercially available design which functions to draw air axially upwardly and discharge the air radially outwardly from the blower wheel.

The fan housing 79 is formed by a bottom or base 83 having a centrally disposed opening 83a through which air passes from the interior of the tower 29 up into the fan housing 79. The base 83 has a downwardly extending flange 83b around its entire periphery to provide rigidity and to provide a drip shield for the connection to the tarp 31, as will be explained in detail below. Secured by bolts to the base 83 concentric with the opening 83a is an inlet cone 85 which facilitates the flow of air into the central portion of the blower wheel 81. The fan housing 79 includes an upper wall or plate 87 to which the motor 77 is bolted. Completing the fan housing 79 and forming the air discharge means are four generally L-shaped wall members 89. Each member 89 has two vertically extending walls connected at a 90° angle to each other with the walls forming the sides of air discharge passageways 91. The L-shaped wall members 89 are welded to the base 83 and to the upper wall 87. Thus the L-shaped wall members form the only interconnection between the base 83 and the upper wall 87. The housing 79 may be compared to a free air plenum, since the air may discharge in almost any direction horizontally through the four discharge passageways 91 which are almost as wide as the blower wheel 81, as may be seen from FIG. 20.

In order to limit the entrance of rain or snow into the fan housing 79, there are provided deflectors 93 which are welded to L-shaped wall members 89, forming a top wall or roof for the passageways 91. The deflectors 93 are positioned with their inner ends beneath the upper wall 87 and sloping downwardly over the lengths of the passageways to the outer ends, which have downturned edges 93a. Thus, the blower 33 serves to draw air inwardly through the aeration plates 29d which line the outer walls of the tower 29, then upwardly within the tower 29 into the fan housing 79, where the air is then discharged through the passageways 91.

Shown in FIG. 4 is the position of the grain conveyor 35 with its auger 57 when the loading of grain commences. The load end of the auger rests within the dump pit 71 or in similar means to direct the dumped grain into the auger 57. The grain is shown being conveyed by the auger to the discharge end where the flexible discharge spout 73 discharges the grain in the area adjacent the aeration tower 29. The grain, as shown in FIG. 4, begins to form a conical pile centered generally at the tower 29 but slightly offset. The slope of the pile is determined by the angle of repose of grain, which also determines the angle of the grain conveyor and the ratio of the tower height to the diameter of the ring 45, as is well known in the art.

The filling of the apparatus 25 continues until the conical pile of grain substantially fills the area within the aeration ring 45. The position of the spout 73 may be moved around the aeration tower 29 periodically during filling to make the conical pile more symmetrical. As the last of the grain is applied to the pile in filling the apparatus 25, the flexible spout 73 is employed by a person at the top of the pile to direct the grain to depressions in order to provide a uniform conical shape to the pile. When the filling has been completed, the conveyor 35 is disassembled and removed from the apparatus, making it available for reuse at other installations which are to be filled. As shown in FIG. 5, the first step in the disassembly involves raising the load end of the auger 51 to facilitate the removal of the flexible spout 73 by supporting its weight on the piled grain. As stated above, the auger 57 is supported by the mast 55 and winch 59 just offset from the balance point so that the load end may be raised as shown in FIG. 5 with a force of about 50 pounds.

Once the flexible spout 73 has been removed, the auger 57 is lowered to the grain pile using the hand winch 59, as shown in FIG. 6. Pairs of workers with carrying slings may then ascend the grain pile and swing the elevated end of the auger 57 about the load end, as shown in FIG. 8 diagrammatically, until the auger 57 is at ground level in a horizontal position. At the same time, the post portion 55b of the mast 55 may be withdrawn upwardly from the grain pile and transported for use at another installation. Even though the bottom portion of the post portion 55b of the mast is buried in the grain, it may be lifted out of its connection with the base portion 55a since the portions are simply telescoped one within the other. As shown in dashed lines in FIG. 7, the base portion 55a of the mast 55 remains buried in the pile of grain after removal of the post portion 55b.

FIG. 9 is illustrative of the manner in which the auger would be transported by a crew of laborers after removal from the grain pile. Depending on the distance to the next facility at which the grain conveyor 35 is to be used, the auger 57 might or might not be disassembled again into its separate segments 57a, 57b and 57c to facilitate transport to the next facility.

After the conveyor 35 has been removed, some manual raking is employed to re-contour the grain pile slightly before applying the tarpaulin or tarp 31 to protect the grain from the weather. As shown in FIGS. 10 and 11, the grain pile at the time filling is completed typically follows the contour indicated. The dashed lines illustrate the desired contour to which the grain is raked manually. This raked contour eliminates depressions in which water might pocket in the tarp 31. Such pockets of water would eventually leak through to the grain. With the grain contoured as shown by the dashed lines, the tarp will shed water and reduce the possibility of leakage.

Figure 14:
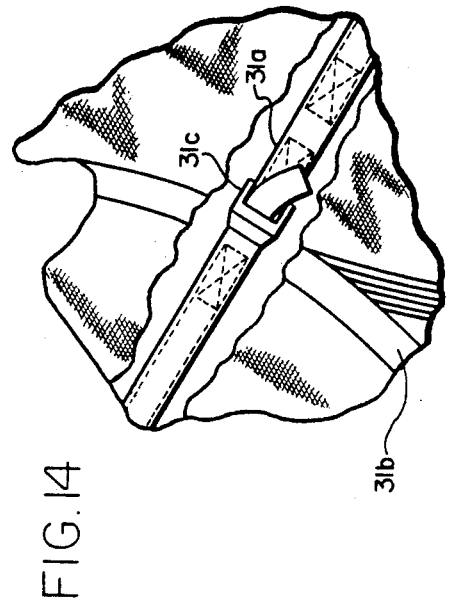
FIG. 14 is an enlarged fragmentary perspective view of the straps and zipper for retaining the two tarp halves together.

The tarp 31 is formed of pie-shaped segments sewn together to provide a conical contour. It is formed in two equal halves which are connected together along radial seams by straps 31a, as shown in FIG. 14, and zippers 31b. The straps 31a, one including a buckle 31c, are sewn to adjacent edges of the two halves of the tarp 31 to secure the halves together at spaced points along the zipper to reduce the forces that must be carried by the zippers, leaving the zippers to function primarily as providing a seal between the adjacent edges of the tarp.

Figure 13:
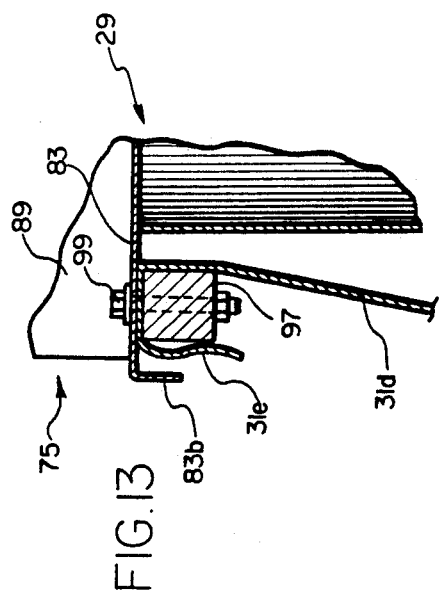
FIG. 13 is an enlarged fragmentary sectional view taken on line 13—13 of FIG. 12.
Figure 12:
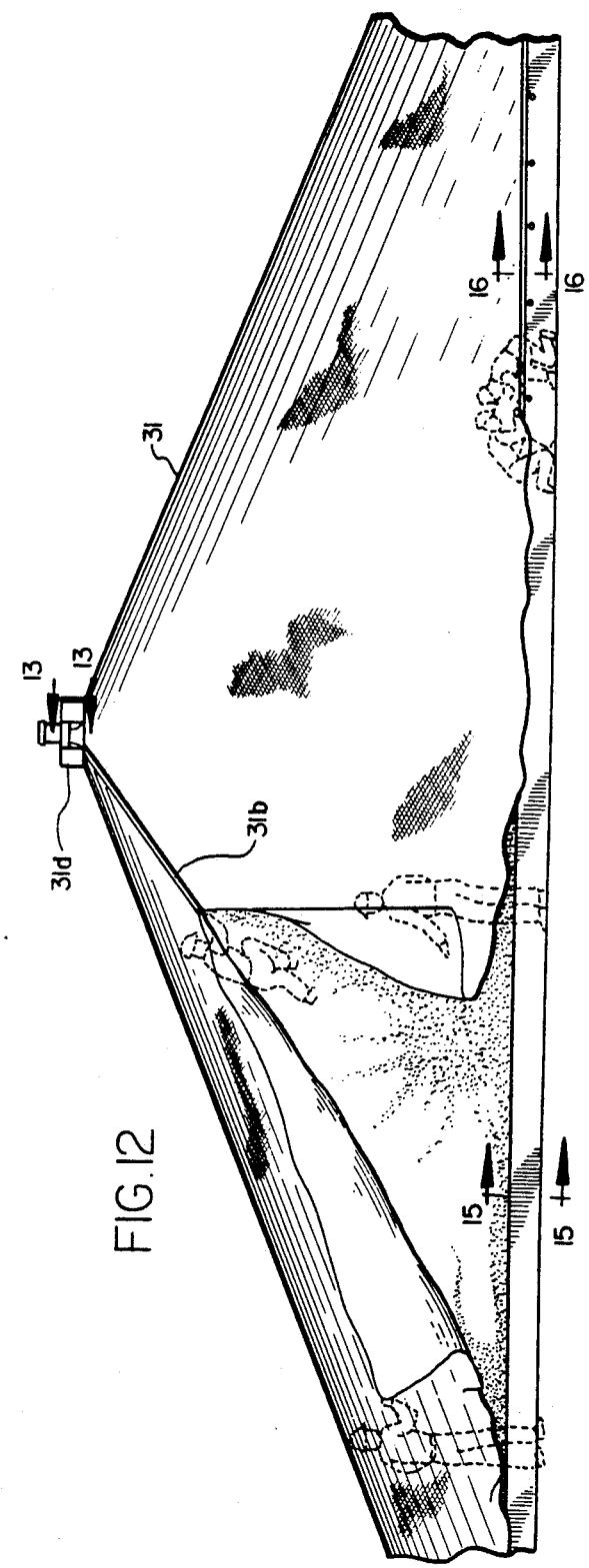
FIG. 12 is an elevational view of the grain storage apparatus of the present invention illustrating the application of the protective tarp over the pile of grain.
Figure 23:
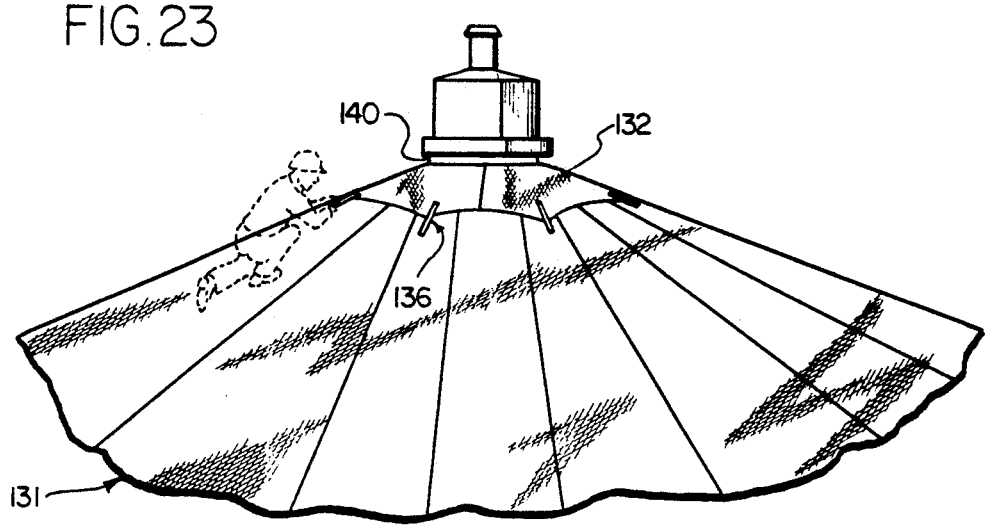
FIG. 23 is a fragmentary perspective view of another embodiment of the invention illustrating the attaching of a protective tarp to a transition tarp which is connected to a tarp ring.

As shown in FIGS. 12 and 22, the inner edge of the tarp 31 is formed with wall portions 31d which conform to the square cross section of the aeration tower 29 and deviate from the conical configuration of the rest of the tarp. In order to secure the tarp 31 to the tower 29 there is provided an edge 31e which is clamped against the underside of the base 83 of the fan housing 79 by a plurality of wood members 97 secured by bolts 99, as shown in FIG. 13. Each of the four members 97 extend along one edge of the base 83 inside of the peripheral flange 83b to completely seal the upper edge 31d of the tarp to the tower 29. Two sets of straps 31a are provided on the abutting edges of the tarp halves in the wall portions 31d to secure the tarp halves against separating. The zippers 31b extend along the abutting edges of the wall portions 31d to assure a sealed connection of the tarp portions in the area of the aeration tower 29.

At the outer periphery of the tarp 31, there is an edge 31f which is folded as shown in FIG. 16 and clamped by wood members 101 secured to the angle members 51 and the aeration ring 45 by bolts 103. As illustrated in FIG. 12, the manual connection of the tarp to the aeration ring may proceed while the radial edges of the two sections of the tarp are being strapped and zippered together. With the assembly of the tarp 31 over the grain pile and the sealing of the edges to the aeration tower 29 and the aeration ring 45, the assembly of the grain storage apparatus 25 is complete and the blower 33 would be energized to begin circulating air through the stored grain.

The above-described apparatus has been demonstrated to be effective in drying as well as maintaining the condition of previously dried grain. In most grain storage facilities, it is necessary to fill with well dried grain since the aeration to many areas of the stored grain is barely adequate to maintain the condition of the grain even if the moisture content is very low. An apparatus built in accordance with the present invention, a blower assembly powered by a low horsepower motor, such as a two horsepower motor, used with a 500 ton unit supplies sufficient aeration to dry and store grain with a 15 to 20 percent moisture content. The present invention provides a relatively uniform flow of air throughout the pile to the aeration tower, as shown by the air flow arrows in FIG. 1 to alleviate any areas of non-drying. The preferred air flow is about double that used with normal storage facilities storing dried grain. It is extremely useful to provide a grain storage facility that has the capacity to dry grain having a relatively high moisture content, since grain drying facilities as such are not available in many countries. The ability of the present system to dry and store grain taken directly from the field provides a significant improvement over prior art grain storage equipment. Most large capacity grain storage facilities have substantial problems with storing grain having a moisture content in excess of 16%. The present invention dries the grain sufficiently for long term storage.

It is noted that in the normal mode of filling the grain storage apparatus 25 of the present invention, the tarp 31 is not applied until all of the grain has been loaded. However, it is contemplated that in the event of rain during the filling, the tarp would be used to temporarily cover the grain pile. It would then be removed when weather permitted and the filling of grain would continue.

Figure 24:
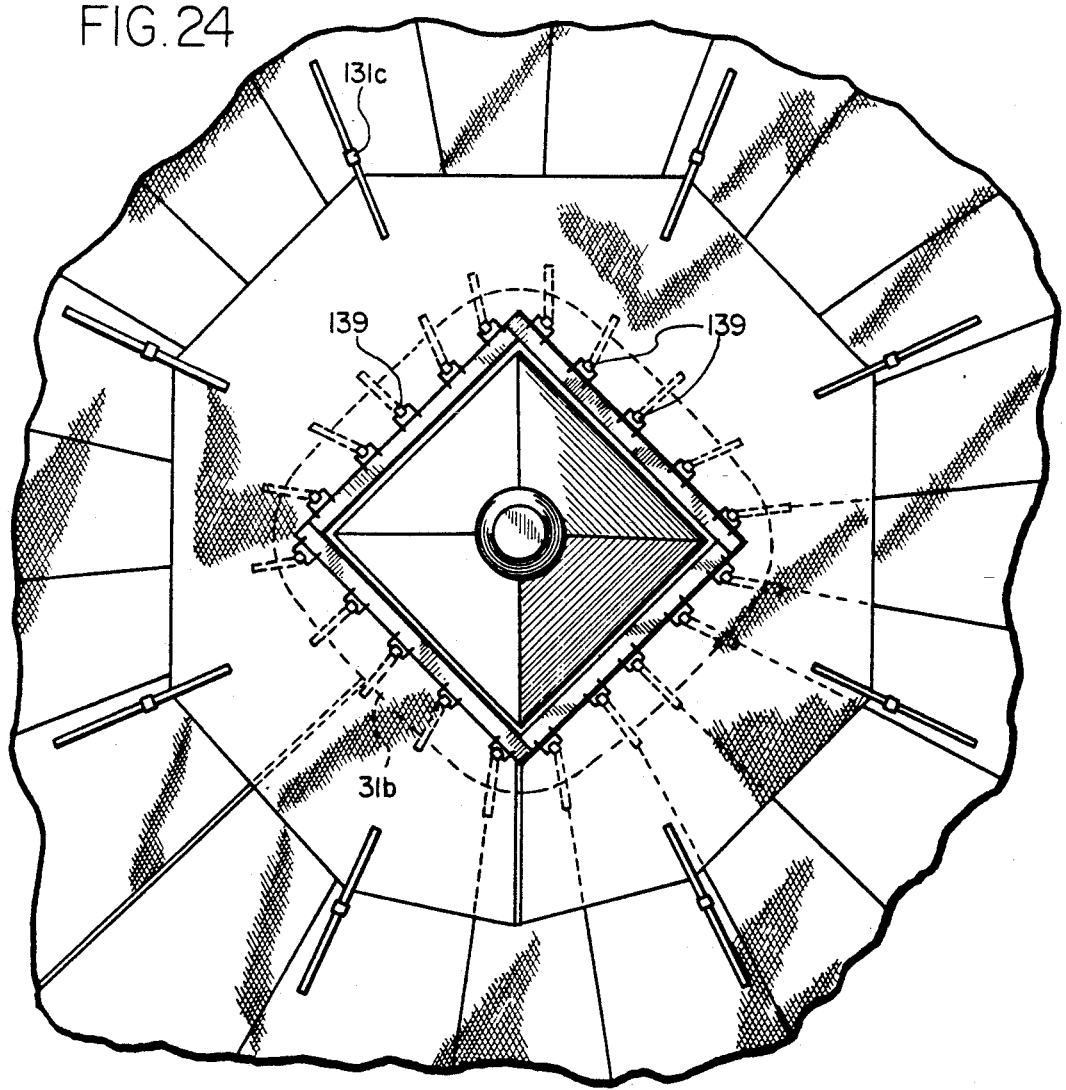
FIG. 24 is a plan view of the tarp ring, transition tarp and main tarp shown in FIG. 23.
Figure 25:
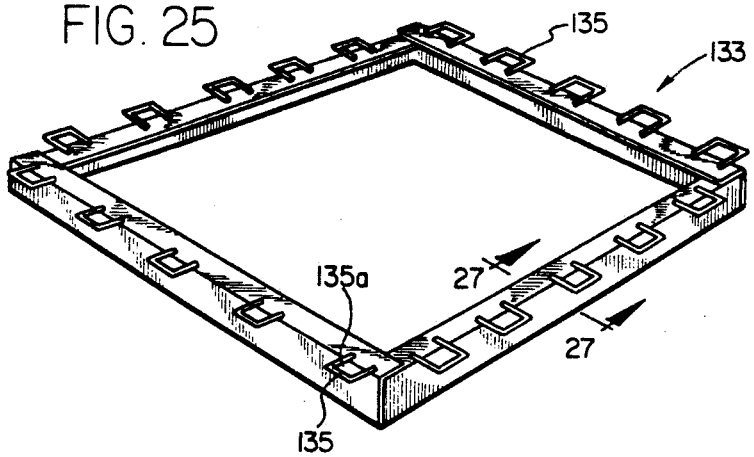
FIG. 25 is a perspective view of the tarp ring.
Figure 27:
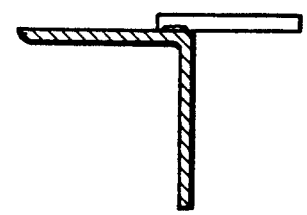
FIG. 27 is a cross-sectional view taken along lines 27—27 in FIG. 25.
Figure 26:
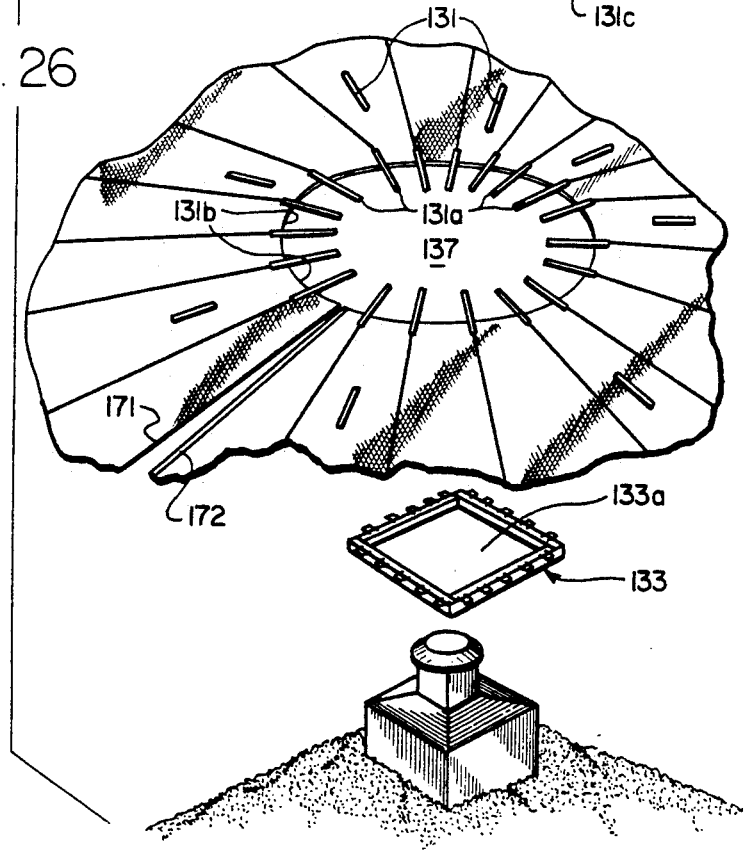
FIG. 26 is an exploded view of the tarp ring, transition tarp, and main tarp.
Figure 28:
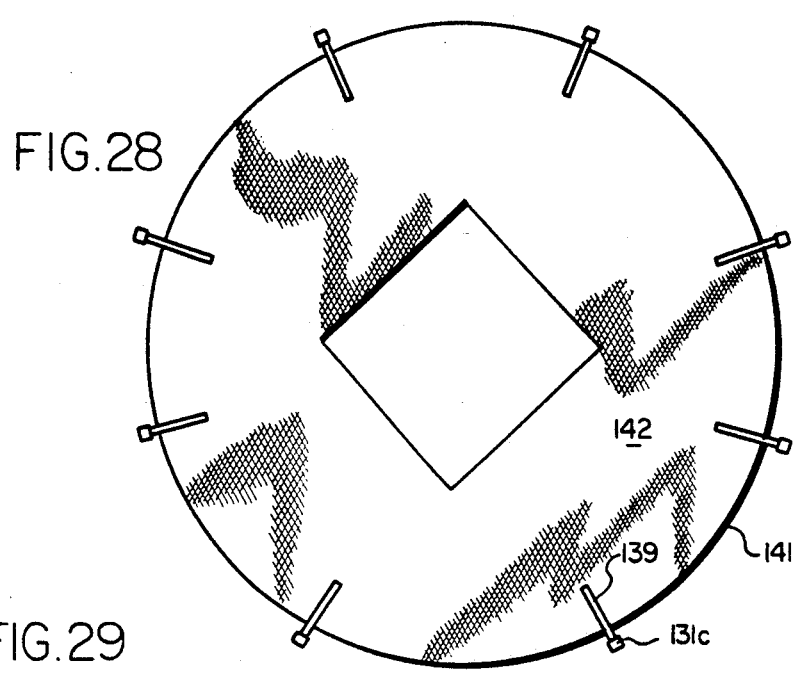
FIG. 28 is a plan view of a transition tarp prior to being applied to a grain pile.
Figure 29:
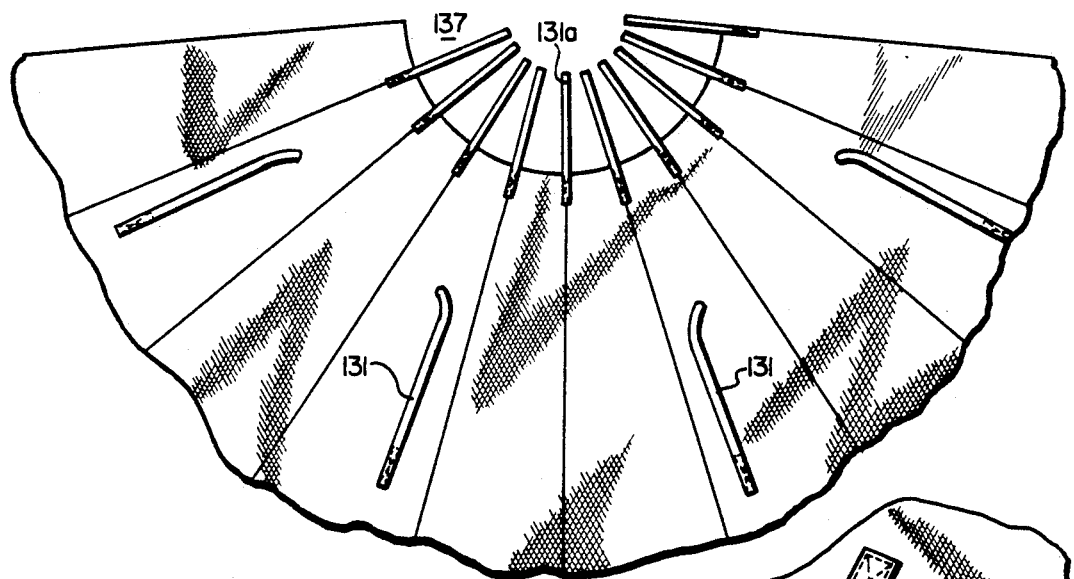
FIG. 29 is a fragmentary view of a portion of the main tarp.
Figure 30:
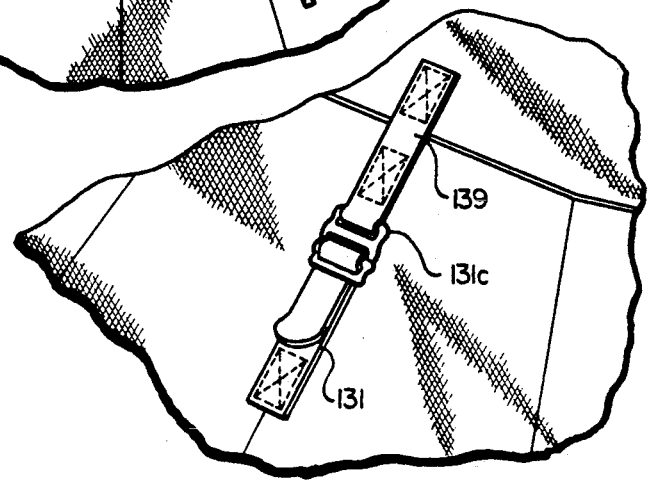
FIG. 30 illustrates a belt fastener connecting the upper end of the main tarp to the lower end of the transition tarp.

In accordance with another embodiment of the invention, which illustrated in FIGS. 23-30, the tarp 31 has been replaced with a main tarp 131 and a transitional tarp 132 which are joined together by straps 136. The transitional tarp is secured to the top of the aeration tower by a ring 133 has a larger size opening than the aeration tower and blower so the ring may be lowered onto the top of the grain pile, as shown in FIG. 26. The ring will be held by the aeration tower and by forces applied generally equally from all sides of the main tarp by the respective encircling group of straps 131a, which upper straps 131a are secured to metal loops 135 on the ring 133. As shown in FIGS. 26 and 29, the upper straps 131a extend beyond a generally circular edge 131b defining a generally circular opening 137 at the upper edge of the main tarp. Each of the straps is drawn through an opening 135a in a loop 135 on the ring, and the strap is brought around the metal loop and is tied to the loop with a knot 139 (FIG. 24). As seen in FIG. 24, the generally circular edge 131b of the main tarp is spaced from the aeration tower 29 and would expose grain except for being covered by the small superimposed transition cover tarp 132. The transition tarp 132 comprises a tubular tower panel 140 (FIGS. 23 and 26) which has a square tubular shape to extend along the vertical sidewalls 49a of the aeration tower to cover the same. The lower edge of the tubular tower panel is sewn to a generally frusto conical panel 142 which has a generally square upper edge 132a at the tower and an eight-sided lower edge 141 overlapping the main tarp. The tubular tower panel has its upper edge secured to the underside of the base plate 83 by wooden members 97, in the same manner as shown in FIG. 13 and as described in connection with the first embodiment of the invention. The lower edge of the transitional tarp panel 142 includes straps 139 which extend down below a lower edge 141 of the transitional tarp; and these straps carry buckles 131c into which are threaded the free ends of the main tarp straps 131. The straps 131 are pulled taut in the buckles to hold down the overlying, lower peripheral edge 141 of the transition tarp over the upper edge portion of the main tarp so that rain, snow, etc. will not flow into the grain pile.

The preferred main tarp is formed of sewn wedge shaped sections sewn along longitudinally extending edges which are overlapped and sewn together by stitches. A single zipper may be used or straps may be used to close side edges 171 and 172 of the main tarp, and side edges 173 and 174 of the transitional tarp.

In the first embodiment of the invention described herein, a ring of concrete, one foot in width and four inches in depth, was formed at the location of the aeration ring; and a two-inch thick asphalt base material layer 39 was formed on a gravel base inside the ring. The asphalt layer provides a generally water-resistant layer to protect the grain from the dampness and microorganisms in the underlying earth. In some instances, it may not be practical to provide an asphalt layer, and it may be desirable to apply a plastic, waterproof sheet 180 (FIG. 31) directly to conical mounded earth 181 contained within the aeration ring 45. A preferred plastic sheet is a polyethylene plastic sheet such as applied to ground in crawl spaces beneath homes or other buildings. A preferred and inexpensive manner of securing the plastic ground cover sheet 180 is to stake it to the ground about the periphery of the aeration ring 45 with stakes 183 (FIGS. 31-33). In this instance, right angle members 147 on the aeration ring have apertures 185 therein through which are driven depending ears 187 on the stakes to locate the stakes and to hold the right angle members down on top of the plastic sheet. The preferred stake, FIG. 33, is generally T-shaped with an upper head having an upper cross-head 189; and a depending stake shaft 191 which is generally V-shaped in cross-section with vertical plates 191a and 191b intersecting at a fold line 191c. The V-shape of the stake shaft adds strength and increases resistance to upwardly-directed forces on the stake to lift the stake from the ground. The lower end 191d of the stake is sharpened to a point to make it easier to drive into the earth. Other manners of securing the plastic ground cover sheet in place may be used in lieu of the staking described herein..

From the foregoing description, it is evident that the present invention provides grain storage apparatus that is sufficiently portable that it may be easily transported to remote areas of any country, and that it may be erected with unskilled workers and without any specialized construction equipment. The aeration tower and the two portions of the conveyor support mast may be shipped either assembled or disassembled to be bolted together at the erection site. The feed auger may be lifted into position by the use of a temporary mast and a manually-operated winch. The upper end of the mast and the winch may be removed and reused at another storage apparatus. The unique fan or blower caps the aeration tower and provides an inexpensive fan construction that can be made without the use of centrifugal fan scroll, which requires expensive equipment to make. The construction of the fan and tower also provides for easy attachment of the upper end of either the main tarp or the transition tarp to a plate that also serves as the blower base and the aeration tower cap. All of the components or subassemblies making up the apparatus 25 may be transported to a remote location in a small truck and assembled and erected by a small crew of laborers. The small amount of cement for foundations 37 and the aeration ring support can be easily mixed manually at the erection site. Thus there is provided improved grain storage apparatus which is easy to ship and erect and which provides improved grain drying and storing facilities making the apparatus well suited to use in any area in which localized grain storage is desired.

Although the invention has been described with respect to a preferred embodiment it will be understood there is no intent to limit the invention by such disclosure, but rather it is intended to cover all modifications and alternative constructions falling within the spirit and scope of the invention as defined in the appended claims.

What is claimed is:

1. A method of constructing and filling a grain storage apparatus comprising:
   preparing a site area to provide a moisturefree surface to receive grain to be stored;
   encircling the site area with an aeration ring;
   erecting an aeration tower in the center of the site area, the tower including means for drawing air through the tower and discharging air to the atmosphere;
   erecting a mast in the site area between the tower and the ring;
   providing an elongated conveyor extending from outside of the ring to the tower;
   elevating the conveyor by means of a power means on the mast to position the conveyor angled downwardly from the top of the tower to the outside of the ring;
   filling the site area with a conical pile of grain supplied by the conveyor; and
   covering the pile with a conical tarp and sealing the tarp at the tower and at the aeration ring.

2. The method of claim 1 including the steps, after forming the conical pile of grain, of lowering the conveyor onto the grain pile and disconnecting the power means from the conveyor, and removing the power means, mast and conveyor from the pile and site area.

3. The method of claim 1 including the step of constructing a foundation in the site area for the aeration tower and the mast, pivotally connecting the tower and the mast to its respective foundation while the mast and the tower are both in a horizontally extending position, pivoting the mast and the tower to an upright position and securing them to the foundation in such upright position.

4. The method of claim 3 wherein the step of constructing a foundation includes providing concrete pylons formed by filling holes in the ground with concrete and embedding bolts in the concrete for securing the tower and mast.

5. The method of claim 1 wherein the conveyor is removed by persons climbing onto the grain pile and carrying the conveyor down from the grain pile and out of the site area.

6. The method of claim 3 wherein the mast includes a base portion connected to the foundation and a post portion having one end slidably received in the base portion, the base portion being left within the grain pile when the post portion is removed from the pile prior to covering with the tarp.

7. The method of claim 1 including the step of providing a dump pit outside of the aeration ring where the load end of the conveyor is received and grain to be filled into the apparatus is placed for transport into the site area by the conveyor.

8. The method of claim 6 wherein the conveyor includes a flexible spout, moving the spout around the aeration tower to form a uniform conical pile centered on the aeration tower and having no depressions or discontinuities.

9. The method of claim 1 including the step of forming an annular concrete ring encircling the site area, securing the aeration ring to the concrete ring.

10. The method of claim 1 including the step of providing a tarp divided in two halves each of which may be readily transported by one person, the two halves having securing means at the abutting edges to provide leak-proof seams connecting the two halves.

11. Apparatus for storing grain under conditions of continuous aeration comprising:
   an aeration tower including an open frame having sidewalls of foraminous plates which allow passage of air but not grain, a central air passageway in the tower terminating at its upper end at a motor driven fan which sucks air through the plates and exhausts it to the atmosphere;
   an aeration ring surrounding the tower and a circular storage site area and defining a foraminous wall through which air is drawn by the fan;
   a grain conveyor including an elongated conveyor supported by a conveyor mast supported in the site area between the aeration tower and the aeration ring, the tubular conveyor having a load end disposed outside of the site area and a discharge end disposed adjacent the top of the aeration tower, a power means on the conveyor mast to raise and lower the discharge end of the tubular conveyor; and
   a tarp, after removal of the grain conveyor including the tubular conveyor and the conveyor mast, said tarp being supported by a conical pile of grain filling the site area.

12. The apparatus for storing grain as set forth in claim 11 wherein said tarp comprises two halves which are joined along radially extending lines by zippers and straps, the tarp having an opening at the center through which the aeration tower extends, the edge of the tarp defining the opening being sealed to the aeration tower.

13. The apparatus for storing grain as set forth in claim 12 wherein said tarp has a peripheral edge which is sealed to the ring at the upper edge of the ring.

14. The apparatus for storing grain as set forth in claim 13 wherein said aeration tower and said ring have peripherally extending sealing surfaces, segments of wood secured to said sealing surfaces clamping said tarp into engagement with said sealing surfaces.

15. The apparatus for storing grain as set forth in claim 11 wherein the power means comprises a winch which is operable manually to raise the tubular conveyor from a horizontally extending position to an angled elevated position with the discharge end adjacent the top of the aeration tower, the winch being operable to lower the tubular conveyor onto the grain pile for disconnection from the winch and manual transport from the grain pile.

16. The apparatus for storing grain as set forth in claim 15 wherein the conveyor mast includes a base portion and a post portion which are detachably assembled together, said post portion being removable from said base portion on completion of the filling of the apparatus with grain which completely buries said base portion and part of said post portion.

17. The apparatus for storing grain as set forth in claim 11 wherein said motor driven fan includes a fan housing having a base supported on the top of said aeration tower, said base supporting an inlet cone aligned with an air inlet opening, said fan housing including a top wall supporting a vertically disposed motor driving a blower wheel positioned adjacent said inlet cone for rotation about a vertical axis, a plurality of horizontally extending air discharge passageways formed in said fan housing by mutually perpendicular walls welded to said base and said top wall.

18. The apparatus for storing grain as set forth in claim 17 wherein said passageways are defined in part by roof portions extending between said sidewalls and angled downwardly from said top wall toward the outer ends of said passageways.

19. A portable grain storage having manually portable elements which may be assembled and erected at a site without construction equipment, comprising:
   an aeration tower mounted in the center of a circular storage site area and having fan means for drawing air horizontally into the tower and exhausting the air from the top of the tower;
   an aeration ring enclosing the site area and including an upstanding foraminous wall;
   a grain conveyor for conveying grain from a loading location outside of said site area to a central discharging location at the level of the top of the aeration tower to form a conical pile of grain filling the site area;
   a detachable support for said conveyor mounted within the site area between the aeration tower and the aeration ring, said support carrying the conveyor with an elevated end at the discharge location and a ground supported end at the loading location during the filling of the site area, at least a portion of said support and said conveyor being removable from the site area upon completion of the filling with grain of the site area; and
   a tarp resting on the conical pile of grain and sealed centrally at said aeration tower and to said ring at the outer periphery.

20. A temporary grain storage facility in accordance with claim 19 wherein said fan means is a motor driven blower having a blower wheel mounted within a fan housing, said blower wheel drawing air upwardly in said tower and discharging air outwardly horizontally around the periphery of the blower wheel, said fan housing having four discharge passageways each passageway extending at 90° to the adjacent passageway, said passageways being substantially equal in width to the diameter of said blower wheel to provide a free air plenum surrounding said blower wheel.

21. A temporary grain storage facility in accordance with claim 20 where said tower and said detachable support are elongated structures which are assembled in a horizontally extending position, a foundation for said tower and said detachable support, hinge means connecting said tower and said detachable support for rotation from said horizontal position to a vertical position, and means for locking said tower and said detachable support in said vertical position.

22. A temporary grain storage facility in accordance with claim 21 wherein said detachable support includes a base portion and a post portion being separably connected, said base portion and a portion of said post portion being covered with grain after the storage facility is filled, said post portion being manually removable from said base portion after said storage facility is filled without disturbing the grain covering said base portion and a portion of said post portion.

23. A method of constructing and filling a grain storage apparatus comprising:
   preparing a site area to provide a moisturefree surface to receive grain to be stored;
   encircling the site area with an aeration ring;
   erecting an aeration tower in the center of the site area, the tower including means for drawing air through the tower and discharging air to the atmosphere;
   assembling portions of a temporary mast at the site to form an elongated mast;

erecting the temporary mast in the site area between the tower and the ring;

providing an elongated conveyor for extending from outside of the ring to the top of the tower;

lifting the conveyor by means of a manually operated means on the mast to position the conveyor angled downwardly from the top of the tower to the outside of the ring;

filling the site area with a conical pile of grain supplied by the conveyor;

covering the pile with a conical tarp and sealing the tarp at the tower and at the aeration ring; and removing at the least the upper portion of the temporary mast and the manually operated power means.

* * * * *